United States Patent [19]
Fisher et al.

[11] 3,987,684
[45] Oct. 26, 1976

[54] ENDLESS POWER TRANSMISSION BELT STRUCTURE

[75] Inventors: David G. Fisher; Billy L. Speer, both of Springfield, Mo.

[73] Assignee: Dayco Corporation, Dayton, Ohio

[22] Filed: July 28, 1975

[21] Appl. No.: 599,916

[52] U.S. Cl. .............................. 74/233; 74/231 P; 74/237; 156/142
[51] Int. Cl.² ...................... F16G 5/16; F16G 1/00; F16G 5/00; B29H 7/22
[58] Field of Search ....... 156/142; 74/231 P, 233 U, 74/234, 237

[56] References Cited
UNITED STATES PATENTS

| | | | |
|---|---|---|---|
| 2,711,778 | 6/1955 | Waugh | 74/233 |
| 2,847,865 | 8/1958 | Rockoff et al. | 74/233 |
| 3,090,716 | 5/1963 | Stevens | 74/233 |
| 3,416,383 | 12/1968 | Jensen et al. | 74/233 |
| 3,566,706 | 3/1971 | Fix | 74/233 |
| 3,800,610 | 4/1974 | Wach | 74/233 |

*Primary Examiner*—Leonard H. Gerin
*Attorney, Agent, or Firm*—Reuben Wolk

[57] ABSTRACT

A trapezoidal endless power transmission belt structure is provided which is made primarily of elastomeric material and has a pair of oppositely arranged surfaces disposed in spaced relation to define an outside and inside surface of the belt structure and has a load-carrying section arranged midway between the inside and outside surfaces. The belt structure has a tension section and a compression section which are of similar construction and each is comprised of a plurality of layers including a fiber-loaded layer disposed adjacent the load-carrying section and a fabric layer disposed remote from the load-carrying section; and, the fabric layers and fiber-loaded layers cooperate to assure that the belt structure has longitudinal flexibility yet has transverse rigidity or stiffness sufficient to enable the belt structure to be operated in associated sheaves free of shear planes parallel to the load-carrying section.

19 Claims, 9 Drawing Figures

ENDLESS POWER TRANSMISSION BELT STRUCTURE

BACKGROUND OF THE INVENTION

Most endless power transmission belts of trapezoidal cross-sectional outline, or so-called V-belts, in current use are made with a load-carrying section which is arranged closer to the wider parallel side of the trapezoidal cross section because heretofore such arrangement has proven superior in many respects. However, many of such currently used V-belts are inherently comparatively expensive because there is considerable scrap produced when cutting such V-belts from the usual cylindrical sleeve produced by many well-known techniques.

To reduce the cost of V-belts by reducing scrap, proposals have been made heretofore to cut the usual cylindrical sleeve in what is often referred to as a balanced manner. Examples of this are shown in U.S. Pat. Nos. 1,432,973; 1,924,355; 2,153,966; and 2,661,045.

It is also well known to provide belts of substantially trapezoidal cross-sectional configuration having a load-carrying section or so-called neutral axis which is located centrally, as shown, for example, in two of the above mentioned U.S. Pat. Nos. 1,924,355 and 2,661,045. U.S. Pat. No. 2,661,045 further teaches the provision of at least one fabric reinforcing layer on each side of the tension member to provide high compressive and tensile moduli in the transverse direction of the belt. However, belts of the type disclosed in these two patents are comparatively expensive to produce.

A V-belt which, in essence, uses the prior art features of the above-mentioned patents is disclosed in U.S. Pat. No. 3,869,933 and it is stated that the belt of this latter mentioned patent may also use fiber-loaded elastomeric material as disclosed in U.S. Pat. No. 3,416,383. However, in FIG. 5 of U.S. Pat. No. 3,869,933 and the associated description in the specification emphasize that a belt having a central load-carrying section and made with fiber-loaded material and layers of stretchable fabric to define its top and bottom surfaces loses its transverse stiffness and sags. Accordingly, great emphasis is given in U.S. Pat. No. 3,869,933 to the use of so-called fabric reinforcing layers which have high compressive and tensile moduli to provide transverse rigidity; however, it is well known that fabric reinforcing layers used in the manner disclosed in this last mentioned patent result in sharply defined shear planes which cause a belt made in this manner to delaminate after a comparatively short service life.

In any event, any V-belt which requires a large number of different layers with each different layer being required to impart a special desired characteristic to the V-belt usually results in adding to the cost of such belt.

Recently, the automobile industry has shown considerable interest in balanced cut V-belts with centrally located load-carrying sections because of the potential cost savings, due to reduced scrap alone, in producing such belts as compared with the usual belts having eccentric load-carrying sections. However, it is a problem to provide such a balanced cut belt with a central neutral axis at minimum cost yet assure the belt is capable of being reliably operated at high speeds over a plurality of small diameter sheaves of the type used on accessories of an automobile engine, for example, for an extended service life.

SUMMARY

It is a feature of this invention to provide a simple, economical, and reliable balanced cut belt structure having a central load-carrying section or central neutral axis which has longitudinal flexibility enabling it to be used over small diameter sheaves yet has sufficient transverse rigidity or stiffness to enable such a belt to be used under normal load conditions for any particular belt size.

Another feature of this invention is to provide an endless power transmission belt structure having a longitudinal dimension and a trapezoidal cross section or outline at each position along the longitudinal dimension and with the belt structure being made primarily of an elastomeric material. The belt structure has a pair of oppositely arranged surfaces disposed in spaced relation to define an outside and an inside surface of the belt structure and has a load-carrying section arranged midway between the outside and inside surfaces. The belt structure has a tension section and a compression section with the tension and compression sections being made of substantially identically arranged layers and with the layers being disposed in the same relative positions with respect to the central load-carrying section. The tension section has a plurality of layers including a fiber-loaded layer disposed adjacent the load-carrying section and a fabric layer disposed remote from the load-carrying section with the fabric layer of said tension section having a surface defining the outside surface of the belt. The compression section has a plurality of layers including a fiber-loaded layer disposed adjacent the load-carrying section and a fabric layer disposed remote from the load-carrying section with the fabric layer of the compression section having a surface defining the inside surface of the belt. Each of the fiber-loaded layers has a plurality of randomly arranged fibers therein which allow longitudinal flexibility yet provide transverse rigidity for the belt free of shear planes parallel to the load-carrying section and each of the fabric layers has a transverse rigidity which is greater than its longitudinal rigidity. The fabric layers cooperate with the fiber-loaded layers to increase the transverse rigidity of the belt and assure satisfactory operation thereof in associated sheaves, including small diameter sheaves.

Accordingly, it is an object of this invention to provide an endless power transmission belt structure of trapezoidal cross-sectional outline having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
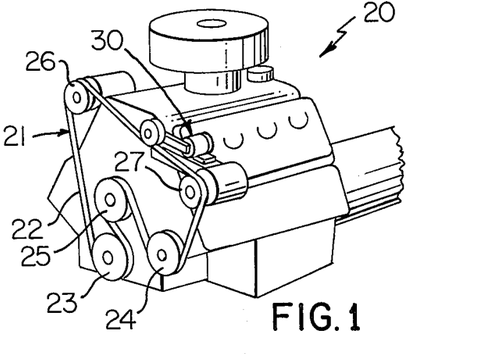
FIG. 1 is a perspective view illustrating one exemplary embodiment of an endless power transmission belt drive system used on an internal combustion engine such as an automobile engine with such belt drive system utilizing one exemplary embodiment of the endless power transmission belt structure or belt of this invention.

Reference is now made to FIG. 1 of the drawings which illustrates an exemplary automobile engine 20 having an endless power transmission belt drive system 21 which utilizes an endless power transmission belt structure or belt 22 of this invention which operatively associates with driving sheave 23 and a plurality of driven sheaves which are designated by the reference numerals 24, 25, 26, and 27; and, the sheaves 24–27 are suitably operatively connected to the usual automobile assemblies or accessories to drive same and as is well known in the art. The drive system 21 of this example is shown utilizing a belt tensioning apparatus 30 for the purpose of providing controlled tension to the belt 22 as it moves in its endless path about its associated sheaves; however, the belt 22 may be operated with or without a belt tensioning apparatus, as desired.

Figure 2:
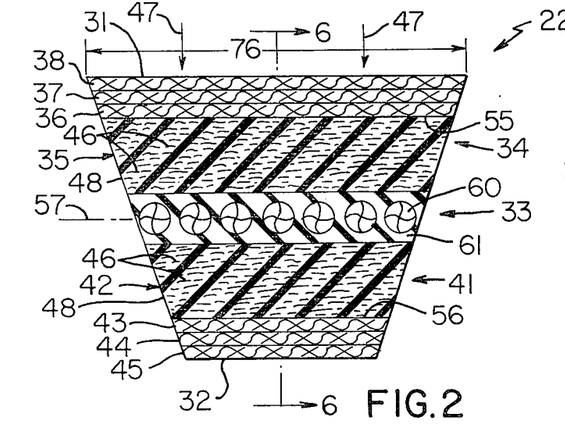
FIG. 2 is an enlarged cross-sectional view of the belt utilized in FIG. 1.

The belt 22 is of the usual endless variety having a longitudinal dimension which, in essence, is defined by the developed length of the endless belt and such belt has a trapezoidal cross-sectional outline, as illustrated in FIG. 2, at each position along its longitudinal dimension; and, the belt 22 is made primarily of elastomeric material in each of its various belt sections. The belt 22 is comprised of a pair of oppositely arranged surfaces disposed in spaced relation to define what will be referred to as an outside surface 31 and an inside surface 32 with the term outside surface referring to the fact that the wider of the parallel sides of the trapezoidal cross section of the belt is normally arranged outwardly of its associated sheaves or pulleys and as will be readily apparent from FIG. 1.

Referring again to FIG. 2, the belt 22 has a load-carrying section which is designated generally by the reference numeral 33 which is arranged midway between the outside surface 31 and the inside surface 32; and, inasmuch as the load-carrying section of a trapezoidal belt is often referred to as the neutral axis of such belt the positioning of the load-carrying section midway between surfaces 31 and 32 has resulted in the belt 22 being popularly referred to as having a central neutral axis.

The belt 22 has a tension section 34 which has a plurality of layers and in this example includes a fiber-loaded layer 35 disposed adjoining the load-carrying section 33 and a plurality of three fabric layers 36, 37, and 38 with the fabric layer 38 being disposed remote from the load-carrying section and having a surface which will be referred to as an outside surface and which defines the outside surface 31 of the belt. It will be seen that the other two fabric layers 36 and 37 of the tension section 34 are arranged such that the layer 36 adjoins the fiber-loaded layer 35, the fabric layer 37 adjoins the layer 36, and the remote layer 38 adjoins the layer 37.

The belt 22 also has a compression section which is designated generally by the reference numeral 41 and is comprised of a plurality of layers including a fiber-loaded layer 42 and a plurality of three fabric layers 43, 44, with 45 being remote from the load-carrying section 33 and the layer 45 having a surface which may be considered an exposed outer surface which defines the inside surface 32 of the belt 22. The fabric layer 43 is arranged adjoining fiber-loaded layer 42 followed by the fabric layer 44 disposed against the layer 43 and the remote layer 45 disposed against the fabric layer 44.

Each of the fiber-loaded layers 35 and 42 has a plurality of randomly arranged fibers embedded therein and a representative few of such fibers have been designated by the same reference numeral 46. The fibers 46 allow longitudinal flexibility for the entire belt 22 as it moves in its endless path yet provide transverse rigidity, i.e., transverse or perpendicular the parallel sides of the trapezoidal cross section, so that upon loading the belt 22 in the transverse direction as indicated by arrows 47 in FIG. 2 the belt is prevented from bowing or what is popularly referred to as dishing, whereby the top surface 31 is prevented from assuming an outwardly concave configuration as viewed in FIG. 2.

The fibers 46 are randomly arranged in a substantially infinite number of planes whereby with such an arrangement the fiber-loaded layers 35 and 42 of the belt 22 are free of clearly defined shear planes parallel to the load-carrying section 33. It has been found by tests that when reinforcing layers of the type defined by various woven fabrics, so-called tire cord fabrics, and the like, are arranged parallel to and closely adjacent a load-carrying section of a belt having a central neutral axis there is a tendency for such reinforcing layers to define shear planes or areas parallel to the load-carrying section (when viewing the belt in cross section) whereby such belt tends to delaminate or pull apart at such shear planes.

The belt 22 not only provides the fiber-loaded layers 35 and 42 which are free of shear planes but also provides layers 36–38 and 43–45 which are a substantial distance from the load-carrying section 33 yet provide some transverse rigidity. The fabric layers 36–38 and 43–45 cooperate with the fiber-loaded layers 35 and 42 to increase the transverse rigidity of the belt 22 and assure satisfactory operation thereof in associated sheaves and with the belt operation being in a non-dishing manner yet all of these layers cooperate to assure that the belt 22 will operate with optimum longitudinal flexibility.

As previously indicated, each of the fiber-loaded layers 35 and 42 has a plurality of randomly arranged fibers 46 embedded therein and each layer 35 and 42 is made of an elastomeric compound which in this example is a rubber compound 48 which serves as a matrix for such fibers. The fibers may be made of any suitable material and are preferably nonmetallic organic fibers each having a diameter ranging between .001 inch and .050 inch and a length ranging between .001 inch and several inches. It will be appreciated that the size (diameter and length) of the fibers in a belt is in general determined by the size of the endless power transmission belt being made utilizing such fibers and the application of such belt. Accordingly, belts having a top width generally of the order of ¼ inch would use smaller fibers while belts having a top width of the order of 4 to 6 inches would use larger fibers. It is to be understood that the belt of this invention may be made in any suitable size and length including belts having top widths falling within the range of ¼ inch through 6 inches.

The fibers 46 may be made of any suitable organic material including but not being limited to nylon, cotton, polyester, and rayon. Further, the fibers 46 may also be made of blends or mixtures of these materials.

Each of the fabric layers 36, 37, and 38 in the tension section, and 43, 44 and 45 in the compression section has a transverse rigidity which is greater than its longitudinal rigidity. Accordingly, each of these layers 36–38 and 43–45 has a longitudinal flexibility which enables the belt 22 utilizing such fabric layers to be easily flexed over pulleys or sheaves, including small diameter sheaves, yet the belt 22 has sufficient transverse rigidity to prevent dishing or bowing thereof and as previously described. In particular, each fabric layer 36–38 and 43–45 has a stiffness or rigid transverse the belt which ranges between 105 and 172 percent greater than the stiffness or rigid along the longitudinal dimension of the belt. For most automotive applications the optimum belt construction has a stiffness transverse the belt which is roughly 125 percent greater than the stiffness along the longitudinal dimension of the belt.

Figures 3, 4:
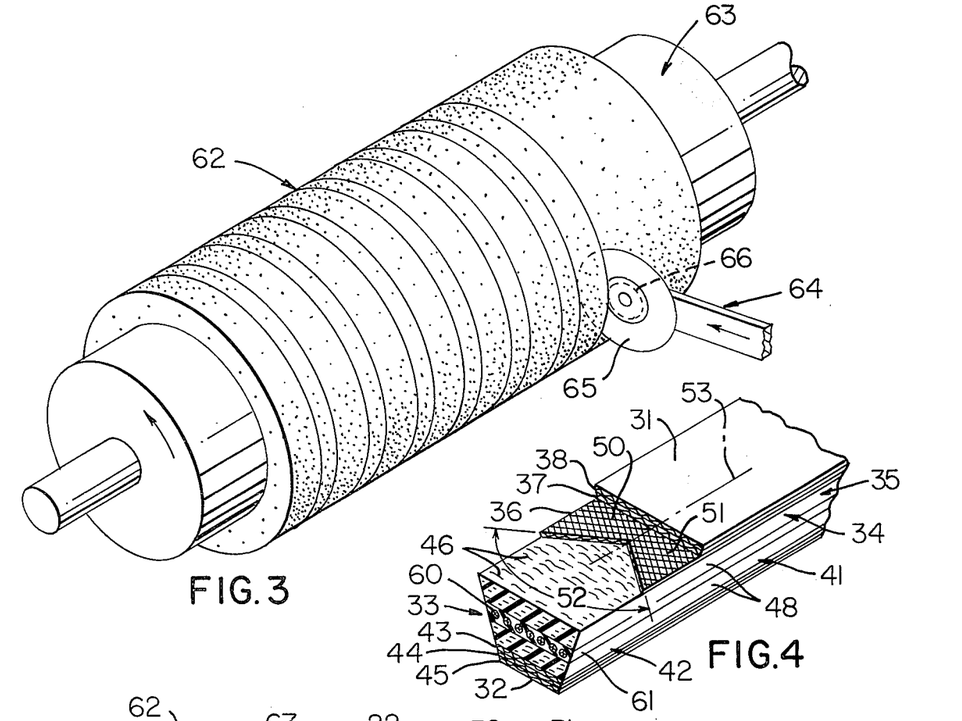
FIG. 3 is a perspective view with certain parts broken away and other parts shown schematically particularly illustrating the manner in which a mandrel supporting a belt sleeve utilized to make a plurality of endless power transmission belts of this invention is cut with an associated cutting device to define such belts.
FIG. 4 is a fragmentary perspective view particularly illustrating a typical fiber-loaded layer and a typical fabric layer provided in both the tension and compression sections of the belt of this invention.

Reference is now made to FIG. 4 of the drawings which illustrates the fabric layer 36 which is typical of the fabric layers 36–38 and 43–45. Fabric of the type used in these layers is well known and disclosed in U.S. Pat. No. 3,478,613.

The fabric layer 36 has warp threads 50 and weft threades 51 which are disposed at an angle 52 ranging between 95 ° and 155° with each other. Each of the warp and weft threads 50 and 51 respectively is disposed at the same angle, which is one half of angle 52, relative to a central plane bisecting a transverse cross section of trapezoidal belt 22 along the longitudinal dimension thereof and for simplicity such plane is indicated by a dot-dash line 53 in FIG. 4.

To assure that there will be no tendency for the belt 22 to delaminate due to the fabric layers 36–38 and 43–45 being too close to the central load-carrying section 33, it will be seen that these layers are kept a substantial distance away from such load-carrying section or central neutral axis. It has been found that by keeping each innermost fabric layer such as 36 and 43 so that an associated inside surface 55 and 56 respectively of each layer is located at least 25 percent of one half of the thickness of the belt structure away from a central plane, indicated by a dot-dash line 56, bisecting the load-carrying section when viewing the belt structure in cross section there is no tendency for delaminating at the clearly defined planes or areas created by surfaces 55 and 56. Thus, the belt structure 22 has no tendency to delaminate yet has all of the advantages inherent in the belt 22 due to its central neutral axis.

The fiber-loaded layers 35 and 42 provide the desired transverse rigidity for the belt 22 in cooperation with the fabric layers and with the individual fibers 46 of the fiber-loaded layers being arranged in a random manner in an infinite number of planes and locations. As will be readily apparent from FIG. 4 each fiber 46 is arranged substantially at a 90° angle to the longitudinal dimension or axis of the belt; however, it will be appreciated that the fibers 46 may be arranged at other angles, as desired, to further control the transverse rigidity of the belt 22.

All components of the endless power transmission belt 22 have been described in detail with the exception of the load-carrying section 33 which will now be described. The load-carrying section 33 may be made of any suitable material or materials and in this example is comprised of a helically wound load-carrying cord 60 which is embedded in a gum-like elastomeric matrix 61, such as neoprene rubber to provide a cushion on opposite sides of and completely around the cord 60. The cord 60 is wound so that a line through the centers of the turns at any cross section is, in essence, line 57 and is positioned midway between the outside surfaces 31 and 32 of the belt. The helically wound load-carrying cord 60 may be made of any suitable material known in the art, and similarly the elastomeric matrix or cushion 61 may also be made of any suitable material which is compatible with the cord 60. The material 61 is also of a material compatible with the materials used to define layers 35 and 42 to assure a tenacious bond therebetween. It will also be appreciated that instead of providing a helically wound load-carrying cord 60 any other suitable load-carrying means may be provided in the belt 22.

The belt 22 is made from a belt sleeve indicated generally by the reference numeral 62 in FIG. 3; and, the belt sleeve 62 is made using a suitable rotatable mandrel assembly 63 in accordance with any technique known in the art. The belt sleeve 62 and assembly 63 may be supported and rotated in accordance with known techniques to enable cutting of a plurality of belts 22 from the sleeve and a cutting device which is designated generally by the reference numeral 64 is used for this purpose.

The cutting device 64 may be of any suitable type capable of being moved inwardly and outwardly into engagement with the belt sleeve 62. In this example the device 64 is shown as having a circular cutting knife 65 which is rotated by a suitable drive mechanism 66 while rotating the mandrel assembly 63 and with the knife 65 in cutting engagement with the sleeve 62 and in accordance with techniques known in the art.

Figure 5:
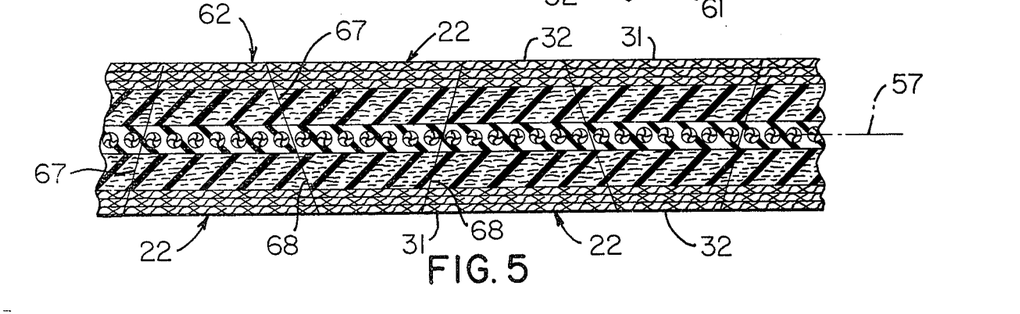
FIG. 5 is a fragmentary cross-sectional view taken longitudinally through the belt sleeve of FIG. 3.
Figure 6:
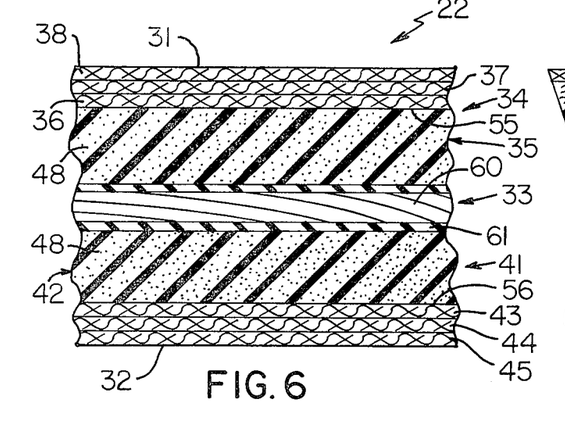
FIG. 6 is a fragmentary cross-sectional view taken essentially on the line 6—6 of FIG. 2.

The cutting device 64 is used to provide a plurality of so-called balanced cuts along the length of the sleeve 62 and a representative few of such cuts are designated by the same reference numeral 67 in FIG. 5. The cuts 67 are suitably spaced and inclined in alternating directions along the length of the sleeve 62 whereby a plurality of belts 22 may be defined along the length of the sleeve 62 without scrap or loss of material. The cuts 67 define trapezoidal belts 22 each having a pair of nonparallel raw-edge sides 68 and it will be appreciated that alternating belts along the sleeve upon being turned inside out are identical to the other bels defined in a normal manner along the sleeve.

Figure 7:
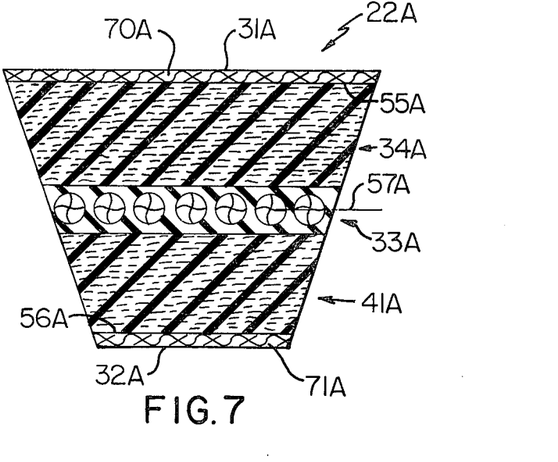
FIG. 7 is a view similar to FIG. 2 illustrating another exemplary embodiment of the belt of this invention.
Figure 8:
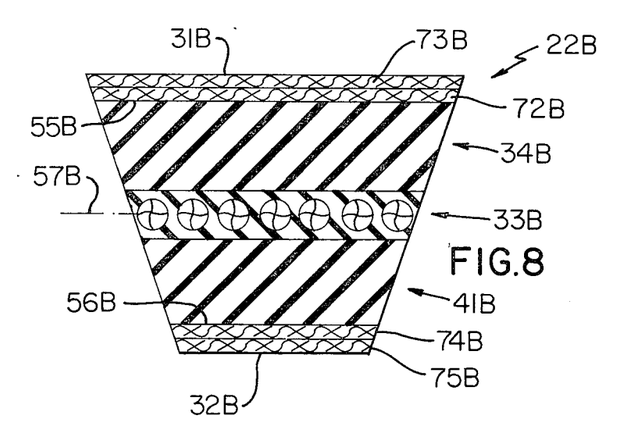
FIG. 8 is a view similar to FIG. 2 illustrating another exemplary embodiment of the belt of this invention.

Other exemplary embodiments of the belt structure or belt of this invention are illustrated in FIGS. 7 and 8 of the drawings. The belts illustrated in FIGS. 7 and 8 are similar to the belt 22; therefore, such belts will be designated by the reference numerals 22A and 22B respectively and representative parts of each belt which are similar to corresponding parts of the belt 22 will be designated in the drawings by the same reference numerals as in the belt 22 (whether or not such representative parts are mentioned in the specification) followed by an associated letter designation, either A or B and not described again in detail. Only those component parts of each belt 22A and 22B which are different from corresponding parts of the belt 22 will be designated by a new reference numeral also followed by the associated letter designation and described in detail.

The only difference between the belt 22A and the belt 22 is that the belt 22A instead of having a plurality of fabric layers comprising its tension section 34A and a plurality of fabric layers comprising its compression section 41A has a single fabric layer 70A in its tension section 34A and a single fabric layer 71A in its compression section 41A. The fabric layers 70A and 71A are substantially identical to the layers 36–38 and 43–45 previously described. Accordingly, it will be appreciated that in the belt 22A the outside surface 31A thereof is defined by the outside surface of the single layer 70A while the inside surface 32A thereof is defined by the outside surface of the fabric layer 71A. Similarly, the layer 70A has an inside surface which is designated by the reference numeral 55A while the layer 71A has an inside surface which is designated by the reference numeral 56A and each of these inside surfaces is located at least 25 percent of one half of the thickness of the belt structure away from the center 57A of the load-carrying section 33A when viewing the belt structure in cross section.

The belt structure 22B of FIG. 8 has a tension section 34B, a load-carrying section 33B, and a compression section 41B; and, it will be seen that the tension section 34B and compression section 41B in each instance has a pair of fabric layers provided therein and the fabric layers in tension section 34B are designated by reference numerals 72B and 73B while the fabric layers in the compression section 41B are designated by the reference numerals 74B and 75B. In this instance the outside surface of the layer 73B defines the outside surface 31B of the belt 22B while the outside surface of the layer 75B defines the inside surface 32B of such belt. Also, in a similar manner as described previously, the inside surface of the innermost layer 72B in the tension section 34B has an inside surface 55B and the innermost layer 74B in the compression section 41B has an inside surface 56B with the surfaces 55B and 56B being located at least 25 percent of one half of the thickness of the belt structure away from the central plane or line 57B bisecting the load-carrying section 33B when viewing the belt structure 22B in cross section.

Each of the belts 22, 22A, and 22B may be of any suitable size ranging from a quarter of an inch top width to six inches top width, for example, as previously mentioned. For a typical automotive application as shown in FIG. 1 exemplary detailed dimensions will now be given for a belt 22, 22A, or 22B having a belt top width 76 (shown in FIG. 2) of 0.422 inch plus or minus 0.032 inch. For such a 0.422 inch top width belt the included angle between the non-parallel sides of the trapezoidal configuration are 36° plus or minus 2°. The thickness of such a belt as measured by the perpendicular distance between the parallel outside surfaces of the trapezoidal cross section is 0.281 inch plus 0.015 minus 0.032 inch. The overall thickness of the load-carrying section 33, 33A, or 33B is generally of the order of 0.040 inch while the thickness of each associated fiber-loaded layer is generally of the order of 0.040 inch with the thickness of each associated fabric layer being of the order of 0.040 inch also. It will be appreciated that the thickness of the fiber-loaded layers adjoining the load-carrying section and the thicknesses of each of the fabric layers will be adjusted to arrive at the desired belt thickness for a particular application, provided that the innermost fabric layer whether it be the innermost layer of a belt having one, two, three, or more fabric layers in each of its tension and compression sections is arranged at least 25 percent of one half of the thickness of the belt structure away from a central plane bisecting the load-carrying section when viewing the belt structure in cross section to assure that there will be no delamination of the character previously described.

The number of fabric layers in each of the tension and compression sections may be increased to more than 3 for certain applications provided that the other size parameters disclosed herein have been satisfied. As is well known in the art for a bsically raw edged belt, the number of fabric layers, in essence, control the amount of friction and ease with which it moves in and out of associated sheaves.

The central neutral axis belt structure of this invention whether in the form of belt 22, 22A, 22B, or some other belt having more than 3 fabric layers in each of its tension and compression sections, in each instance in addition to offering the advantages of economical fabrication while using comparatively inexpensive materials has excellent flex life. The belt of this invention has excellent flex life even in applications where the belt is bent reversely because with the neutral axis located centrally there would be minimum stresses imposed on the belt.

Figure 9:
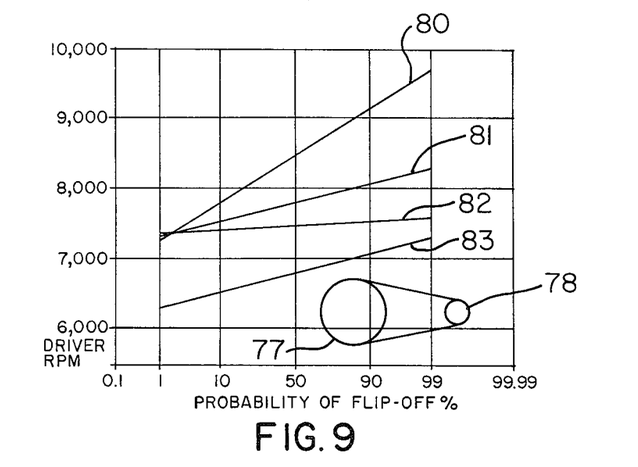
FIG. 9 is a graph illustrating that the improved belt of this invention may be operated in associated test sheaves at belt speeds which are comparatively higher than similar belts of previously proposed constructions with eccentric neutral axes and with the same top width.

In high speed applications the belt of this invention is superior to belts in which the normal neutral axis is located eccentrically or closely adjacent the wide parallel side of the trapezoidal belt. To illustrate this feature reference is made to FIG. 9 of the drawings which presents in graph form a plurality of curves of various belts tested over a pair of pulleys in the form of a 7.86 inch diameter driver pulley 77 and a 2.62 inch diameter driven pulley 78. The graph of FIG. 9 presents a plot of driver pulley revolutions per minute or RPM as the ordinate and probability of belt flip-off in percent as the abscissa.

The curve 80 illustrates the belt of this invention having a 0.422 inch top width and shows that the belt tended to flip off of its pulleys at a medium speed of 8942 RPM. The curve 81 is a three ply V-belt of standard construction having the same 0.422 top width and this belt tended to flip off at an average speed of 7800 RPM. The curve 82 is of a 0.422 inch heavy duty V-belt and this belt tended to flip off at an average speed of 7471 RPM. The curve 83 is of another heavy duty 0.422 inch top width wrapped belt and this belt tended to flip off at an average speed of 6796 RPM. Thus, it is apparent that the central neutral axis belt of this invention has superior stability when operating at high speed in associated sheaves.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt structure having a longitudinal dimension and a trapezoidal cross-sectional outline at each position along said longitudinal dimension, said belt structure being made primarily of elastomeric material and comprising, a pair of oppositely arranged surfaces disposed in spaced relation to define an outside and inside surface of said belt structure, a load-carrying section arranged midway between said outside and inside surfaces, a tension section having a plurality of layers including a fiber-loaded layer disposed adjoining said load-carrying section and a fabric layer disposed remote from said load-carrying section, said fabric layer of said tension section having a surface defining said outside surface of said belt, a compression section having a plurality of layers including a fiber-loaded layer disposed adjoining said load-carrying section and a fabric layer disposed remote from said load-carrying section, said fabric layer of said compression section having a surface defining said inside surface of said belt, each of said fiber-loaded layers having a plurality of randomly arranged fibers therein which allow longitudinal flexibility yet provide transverse rigidity for said belt free of shear planes parallel to said load-carrying section, each of said fabric layers having a transverse rigidity which is greater than its longitudinal rigidity, said fabric layers cooperating with said fiber-loaded layers to increase the transverse rigidity of said belt and assure satisfactory operation thereof in associated sheaves.

2. A belt structure as set forth in claim 1 in which said elastomeric material is rubber.

3. A belt structure as set forth in claim 2 in which each of said fiber-loaded layers is comprised of ten to 40 parts of fibers to 100 parts of rubber.

4. A belt structure as set forth in claim 3 in which said fibers are in the form of organic fibers each having a diameter ranging between 0.001 inch and 0.050 inch and a length ranging between 0.001 inch and several inches.

5. A belt structure as set forth in claim 1 in which each of said fiber-loaded layers is defined by a matrix in the form of a rubber compound and said plurality of fibers in each fiber-loaded layer extend at an angle to said longitudinal dimension of said belt structure to assure each fiber-loaded layer has said longitudinal flexibility and said transverse rigidity.

6. A belt structure as set forth in claim 1 in which each of said fiber-loaded layers is defined by a matrix in the form of a rubber compound and said plurality of fibers in each fiber-loaded layer extend substantially at a 90° angle to said longitudinal dimension of said belt structure to assure each fiber-loaded layer has said longitudinal flexibility and said transverse rigidity.

7. A belt structure as set forth in claim 1 in which each of said fabric layers has a stiffness transverse said belt structure which ranges between 105 and 172% greater than the stiffness along the longitudinal dimension of said belt structure.

8. A belt structure as set forth in claim 1 in which each of said fabric layers is defined by warp and weft threads disposed at an angle ranging between 95° and 155° with each other, each of said warp and weft threads being disposed at the same angle relative to a plane bisecting a transverse cross section of said trapezoidal belt structure along the longitudinal dimension thereof.

9. A belt structure as set forth in claim 1 in which each of said fiber-loaded layers is defined by a matrix in the form of a rubber compound having 10 to 40 parts of fibers to 100 parts of said rubber compound and each of said fabric layers has warp and weft threads therein disposed at an angle ranging between 95° and 155° with each other.

10. A belt structure as set forth in claim 9 in which said plurality of layers in each of said tension section and compression sections comprises at least another fabric layer adjoining an inside surface of the fabric layer disposed remote from said load-carrying section.

11. A belt structure as set forth in claim 1 in which said plurality of layers in each of said tension and compression sections comprises a plurality of fabric layers arranged inwardly of the fabric layer disposed remote from said load-carrying section.

12. A belt structure as set forth in claim 1 in which said fabric layer in each of said tension and compression sections has an inside surface which is located at least 25% of one half of the thickness of the belt structure away from a central plane bisecting said load-carrying section when viewing the belt structure in cross section.

13. A belt structure as set forth in claim 1 in which said plurality of layers in each of said tension and compression sections comprises a plurality of two fabric layers arranged inwardly of the fabric layer disposed remote from said load-carrying section and the fabric layer in each of said tension and compression sections adjoining its associated fiber-loaded layer has an inside surface which is located at least 25% of one half of the thickness of the belt structure away from a central plane bisecting said load-carrying section when viewing the belt structure in cross section.

14. A belt structure as set forth in claim 1 in which said plurality of layers in each of said tension and compression sections comprises a fabric layer arranged inwardly of the fabric layer disposed remote from said load-carrying section and the inwardly arranged fabric layer in each of said tension and compression sections has an inside surface which is located at least 25% of one half of the thickness of the belt structure away from a central plane bisecting said load-carrying section when viewing the belt structure in cross section.

15. An endless power transmission belt structure having a longitudinal dimension and a trapezoidal cross-sectional outline at each position along said longitudinal dimension, said belt structure being made primarily of rubber and comprising, a pair of oppositely arranged surfaces disposed in spaced relation to define an outside and inside surface of said belt, a load-carrying section arranged midway between said outside and inside surfaces, a tension section having a plurality of layers including a fiber-loaded layer disposed adjoining said load-carrying section and a fabric layer disposed remote from said load-carrying section, said fabric layer of said tension section having a surface defining said outside surface of said belt, a compression section having a plurality of layers including 100 fiber-loaded layer disposed adjoining said load-carrying section and a fabric layer disposed remote from said load-carrying section, said fabric layer of said compression section having a surface defining said inside surface of said belt, each of said fiber-loaded layers having a plurality of randomly arranged fibers therein which allow longitudinal flexibility yet provide transverse rigidity for said belt free of shear planes parallel to said load-carrying section, each of said fiber-loaded layers having 10 to 40 parts of fibers to 100 parts of rubber, each of said fabric layers having a transverse rigidity which is greater than its longitudinal rigidity, said fabric layers cooperating with said fiber-loaded layers to increase the transverse rigidity of said belt and assure satisfactory operation thereof in associated sheaves.

16. A belt structure as set forth in claim 15 in which each of said fabric layers is defined by wrap and weft threads disposed at an angle ranging between 95° and 155° with each other, each of said warp and weft threads being disposed at the same angle relative to a plane bisecting a transverse cross-section of said trapezoidal belt structure along the longitudinal dimension thereof.

17. A belt structure as set forth in claim 16 in which each of said fabric layers has a stiffness transverse said belt structure which ranges between 105 and 172% greater than the stiffness along the longitudinal dimension of said belt structure.

18. A belt structure as set forth in claim 17 in which said fibers are in the form of organic fibers each having a diameter ranging between 0.001 inch and 0.050 inch and a length ranging between 0.001 inch and several inches.

19. A belt structure as set forth in claim 15 in which said plurality of layers in each of said tension and compresson sections comprises at least one fabric layer arranged inwardly of the fabric layer disposed remote from said load-carrying section and the inwardly arranged fabric layer in each of said tension and compression sections has an inside surface which is located at least 25% of one half of the thickness of the belt structure away from a central plane bisecting said load-carrying section when viewing the belt structure in cross section.

* * * * *

UNITED STATES PATENT OFFICE
CERTIFICATE OF CORRECTION

PATENT NO. : 3,987,684
DATED : October 26, 1976
INVENTOR(S) : David G. Fisher and Billy L. Speer It is certified that error appears in the above-identified patent and that said Letters Patent are hereby corrected as shown below:

Column 5, line 33, "rigid" should be --- rigidity ---

Column 5, line 35, "rigid" should be --- rigidity ---

Column 8, line 28, "bsically" should be --- basically ---

Column 8, line 57, "medium" should be --- median ---

Signed and Sealed this

First Day of February 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,987,684                Dated October 26, 1976

Inventor(s) David G. Fisher and Billy L. Speer

It is certified that error appears in the above-identified patent and that said Letters Patent are hereby corrected as shown below:

Column 10, line 64, "100" should be --a--

Signed and Sealed this

Twenty-third Day of September 1986

[SEAL]

Attest:

DONALD J. QUIGG

Attesting Officer      Commissioner of Patents and Trademarks